US009607479B2

(12) United States Patent
Robbins et al.

(10) Patent No.: US 9,607,479 B2
(45) Date of Patent: Mar. 28, 2017

(54) TOURNAMENT GAMING SYSTEM WITH SHARED ELEMENTS

(71) Applicant: WMS Gaming Inc., Waukegan, IL (US)

(72) Inventors: Richard B. Robbins, Glenview, IL (US); Joel R. Jaffe, Glenview, IL (US); Daniel P. Louie, Chicago, IL (US); Zachary T. Salem, Surry Hills (AU); Aaron Jon Schurman, Cedar Falls, IA (US); Jamie W. Vann, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 273 days.

(21) Appl. No.: 14/479,364

(22) Filed: Sep. 7, 2014

(65) Prior Publication Data

US 2015/0088289 A1 Mar. 26, 2015

Related U.S. Application Data

(60) Provisional application No. 61/880,361, filed on Sep. 20, 2013.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/32* | (2006.01) |

(52) U.S. Cl.
CPC ...... *G07F 17/3276* (2013.01); *G07F 17/3244* (2013.01)

(58) Field of Classification Search
USPC ......... 463/20, 22, 25, 29, 39, 40, 42; 700/91
See application file for complete search history.

(56) References Cited

U.S. PATENT DOCUMENTS

| | | | |
|---|---|---|---|
| 6,039,648 | A | 3/2000 | Guinn et al. |
| 6,077,162 | A | 6/2000 | Weiss |
| 6,224,486 | B1 | 5/2001 | Walker et al. |
| 6,425,828 | B2 | 7/2002 | Walker et al. |
| 6,817,948 | B2 | 11/2004 | Pascal et al. |
| 6,884,167 | B2 | 4/2005 | Walker et al. |

(Continued)

FOREIGN PATENT DOCUMENTS

| | | | |
|---|---|---|---|
| WO | WO0233640 | A1 | 4/2002 |
| WO | WO03083796 | A1 | 10/2003 |

(Continued)

*Primary Examiner* — Adetokunbo O Torimiro
(74) *Attorney, Agent, or Firm* — Nixon Peabody LLP

(57) ABSTRACT

A tournament gaming system offers a wagering game tournament to players and includes displaying game-play series on a first display device and a second display device. A plurality of players, including a first player and a second player, participate in the game-play series. In accordance with respective randomly selected outcomes achieved in the plurality of game-play series, the players are assigned a tournament rank. A tournament element is shared between the first player and the second player in response to a tournament incentive. The tournament element has an effect on the tournament rank. A tournament award is awarded based on the tournament rank.

19 Claims, 7 Drawing Sheets

(56) References Cited

U.S. PATENT DOCUMENTS

| | | | |
|---|---|---|---|
| 6,908,390 B2 | 6/2005 | Nguyen et al. | |
| 7,192,352 B2 | 3/2007 | Walker et al. | |
| 7,362,862 B2 | 4/2008 | Schneier et al. | |
| 7,390,255 B2 | 6/2008 | Walker et al. | |
| 7,438,642 B2 | 10/2008 | Walker et al. | |
| 7,455,587 B2 | 11/2008 | Olive et al. | |
| 7,684,874 B2 | 3/2010 | Schlottmann et al. | |
| 7,684,882 B2 | 3/2010 | Baerlocher et al. | |
| 7,689,302 B2 | 3/2010 | Schlottmann et al. | |
| 7,690,996 B2 | 4/2010 | Iddings et al. | |
| 7,704,144 B2 * | 4/2010 | Abbott | G07F 17/32 463/11 |
| 7,753,790 B2 | 7/2010 | Nguyen et al. | |
| 7,787,972 B2 | 8/2010 | Schlottmann et al. | |
| 7,798,901 B2 | 9/2010 | Nguyen et al. | |
| 7,824,267 B2 | 11/2010 | Cannon et al. | |
| 7,972,209 B2 | 7/2011 | Kelly et al. | |
| 7,976,389 B2 | 7/2011 | Cannon et al. | |
| 7,985,132 B2 | 7/2011 | Walker et al. | |
| 8,002,630 B2 * | 8/2011 | Nguyen | A63F 13/12 463/16 |
| 8,043,157 B2 | 10/2011 | Cannon et al. | |
| 8,070,583 B2 | 12/2011 | Baerlocher et al. | |
| 8,092,309 B2 | 1/2012 | Bickley | |
| 8,113,936 B2 | 2/2012 | Filipour et al. | |
| 8,133,106 B2 | 3/2012 | Englman | |
| 8,157,647 B2 | 4/2012 | House et al. | |
| 8,246,439 B2 | 8/2012 | Kelly et al. | |
| 8,317,620 B2 | 11/2012 | Kelly et al. | |
| 8,342,957 B2 | 1/2013 | Carpenter et al. | |
| 8,419,520 B2 | 4/2013 | Johnson | |
| 8,419,546 B2 | 4/2013 | Decasa et al. | |
| 8,430,736 B2 | 4/2013 | Cannon et al. | |
| 8,435,107 B2 | 5/2013 | Englman | |
| 8,449,384 B2 | 5/2013 | Baerlocher et al. | |
| 8,449,386 B2 | 5/2013 | Englman et al. | |
| 8,469,788 B2 | 6/2013 | Carpenter et al. | |
| 8,485,892 B2 | 7/2013 | Nguyen et al. | |
| 2002/0119824 A1 * | 8/2002 | Allen | A63F 13/12 463/42 |
| 2003/0130041 A1 | 7/2003 | Pascal et al. | |
| 2005/0043088 A1 | 2/2005 | Nguyen et al. | |
| 2005/0043089 A1 | 2/2005 | Nguyen et al. | |
| 2005/0043094 A1 | 2/2005 | Nguyen et al. | |
| 2005/0148380 A1 | 7/2005 | Cannon et al. | |
| 2005/0221882 A1 | 10/2005 | Nguyen et al. | |
| 2006/0241795 A1 * | 10/2006 | Weingardt | G07F 17/3276 700/91 |
| 2007/0026935 A1 | 2/2007 | Wolf et al. | |
| 2007/0293293 A1 | 12/2007 | Baerlocher et al. | |
| 2007/0298857 A1 | 12/2007 | Schlottmann et al. | |
| 2008/0009344 A1 | 1/2008 | Graham et al. | |
| 2008/0045344 A1 | 2/2008 | Schlottmann et al. | |
| 2008/0064502 A1 | 3/2008 | Schlottmann et al. | |
| 2008/0070680 A1 | 3/2008 | Baerlocher et al. | |
| 2008/0070692 A1 | 3/2008 | Schlottmann et al. | |
| 2008/0070693 A1 | 3/2008 | Schlottmann et al. | |
| 2008/0070694 A1 | 3/2008 | Schlottmann et al. | |
| 2008/0070695 A1 | 3/2008 | Baerlocher et al. | |
| 2008/0108404 A1 | 5/2008 | Iddings et al. | |
| 2008/0176619 A1 | 7/2008 | Kelly et al. | |
| 2008/0176625 A1 | 7/2008 | Kelly et al. | |
| 2008/0176660 A1 | 7/2008 | Kelly et al. | |
| 2008/0220857 A1 | 9/2008 | Kelly et al. | |
| 2008/0227524 A1 | 9/2008 | Kelly et al. | |
| 2008/0227525 A1 | 9/2008 | Kelly et al. | |
| 2008/0227534 A1 | 9/2008 | Kelly et al. | |
| 2008/0227538 A1 | 9/2008 | Kelly et al. | |
| 2008/0227551 A1 | 9/2008 | Kelly et al. | |
| 2008/0254883 A1 | 10/2008 | Patel et al. | |
| 2008/0254893 A1 | 10/2008 | Patel et al. | |
| 2008/0300039 A9 | 12/2008 | Kelly et al. | |
| 2009/0005146 A9 | 1/2009 | Kelly et al. | |
| 2009/0005152 A9 | 1/2009 | Kelly et al. | |
| 2009/0005158 A9 | 1/2009 | Kelly et al. | |
| 2009/0005170 A9 | 1/2009 | Kelly et al. | |
| 2009/0011827 A1 * | 1/2009 | Englman | G07F 17/34 463/27 |
| 2009/0069092 A1 | 3/2009 | Kelly et al. | |
| 2009/0069093 A1 | 3/2009 | Kelly et al. | |
| 2009/0104960 A1 | 4/2009 | Kelly et al. | |
| 2009/0104965 A1 | 4/2009 | House et al. | |
| 2009/0104987 A1 | 4/2009 | Kelly et al. | |
| 2009/0131142 A1 | 5/2009 | Kelly | |
| 2009/0131143 A1 | 5/2009 | Kelly | |
| 2009/0131175 A1 | 5/2009 | Kelly et al. | |
| 2009/0239610 A1 | 9/2009 | Olive et al. | |
| 2009/0275374 A1 | 11/2009 | Nelson et al. | |
| 2009/0280904 A1 | 11/2009 | Nicely et al. | |
| 2010/0087249 A1 | 4/2010 | Rowe | |
| 2010/0113162 A1 | 5/2010 | Vemuri et al. | |
| 2010/0120522 A1 | 5/2010 | Englman et al. | |
| 2010/0137052 A1 | 6/2010 | Bennett | |
| 2010/0240443 A1 | 9/2010 | Baerlocher et al. | |
| 2011/0014964 A1 | 1/2011 | Crowder, Jr. et al. | |
| 2011/0077071 A1 | 3/2011 | Decasa et al. | |
| 2011/0105208 A1 | 5/2011 | Bickley | |
| 2011/0218033 A1 | 9/2011 | Englman et al. | |
| 2011/0251703 A1 | 10/2011 | Nguyen et al. | |
| 2011/0256936 A1 | 10/2011 | Walker et al. | |
| 2012/0009994 A1 | 1/2012 | Cannon et al. | |
| 2012/0083331 A1 | 4/2012 | Carpenter et al. | |
| 2012/0083334 A1 | 4/2012 | Johnson | |
| 2012/0083908 A1 | 4/2012 | Carpenter et al. | |
| 2012/0122561 A1 | 5/2012 | Hedrick et al. | |
| 2012/0129593 A1 | 5/2012 | Englman | |
| 2012/0149474 A1 | 6/2012 | Bickley | |
| 2012/0172136 A1 | 7/2012 | House et al. | |
| 2012/0302310 A1 | 11/2012 | Kelly et al. | |
| 2013/0029739 A1 | 1/2013 | Ramsey et al. | |
| 2013/0065659 A1 | 3/2013 | Johnson et al. | |
| 2013/0065693 A1 | 3/2013 | Johnson et al. | |
| 2013/0079107 A1 | 3/2013 | Owens et al. | |
| 2013/0079119 A1 | 3/2013 | Owens et al. | |
| 2013/0084948 A1 | 4/2013 | Watkins et al. | |
| 2013/0084965 A1 | 4/2013 | Gura et al. | |
| 2013/0116031 A1 | 5/2013 | Carpenter et al. | |
| 2013/0116809 A1 | 5/2013 | Carpenter et al. | |
| 2013/0123006 A1 | 5/2013 | Kelly et al. | |
| 2014/0282192 A1 * | 9/2014 | Grossman | G06F 3/0484 715/771 |

FOREIGN PATENT DOCUMENTS

| | | |
|---|---|---|
| WO | WO2005110563 A2 | 11/2005 |
| WO | WO2009052300 A1 | 4/2009 |
| WO | WO2009062187 A1 | 5/2009 |
| WO | WO2010054061 A1 | 5/2010 |

* cited by examiner

TOURNAMENT GAMING SYSTEM WITH SHARED ELEMENTS

CROSS-REFERENCE TO RELATED APPLICATIONS

This application claims the benefit of and priority to U.S. Provisional Patent Application No. 61/880,361 titled "Tournament Gaming System With Shared Elements" and filed on Sep. 20, 2013, which is incorporated herein by reference in its respective entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a tournament system in which tournament elements are shared between players.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Traditionally, gaming machines operate under control of a processor that has been programmed to execute base games and bonus games in which reel arrays spin and stop to display symbol combinations in a display area. If winning combinations are achieved by the symbol combinations, awards are provided to the players.

SUMMARY OF THE INVENTION

According to one aspect of the present invention, a tournament gaming system offers a wagering game tournament to a plurality of players. The tournament gaming system includes one or more input devices, a plurality of display devices, one or more processors, and one or more memory devices. The display devices include at least a first display device and a second display device. The memory devices store instructions that, when executed by at least one of the one or more processors, cause the tournament gaming system to display plurality of game-play series of the wagering game tournament on at least the first display device and the second display device. Randomly selected outcomes are determined in the plurality of game-play series in which the plurality of players participate. The plurality of players includes a first player and a second player. A tournament rank is assigned to each of the plurality of players in accordance with respective outcomes of the randomly selected outcomes achieved in the plurality of game-play series. In response to a tournament incentive, a tournament element is shared between the first player and the second player. The tournament element has an effect on the tournament rank. A tournament award is awarded based on the tournament rank.

According to another aspect of the invention, a computer-implemented method is directed to offering a wagering game tournament to a plurality of players. The computer-implemented method includes displaying game-play series of the wagering game tournament on at least a first display device and a second display device. Randomly selected outcomes are determined, by at least one of one or more processors, in the plurality of game-play series in which the plurality of players participate, the plurality of players including a first player and a second player. A tournament rank is assigned, by at least one of the one or more processors, to each of the plurality of players in accordance with respective outcomes of the randomly selected outcomes achieved in the plurality of game-play series. In response to a tournament incentive, a tournament element is shared, by at least one of the one or more processors, between the first player and the second player. The tournament element has an effect on the tournament rank. At least one tournament award is awarded, by at least one of the one or more processors, based on the tournament rank.

According to a further aspect of the invention, one or more machine-readable storage media includes instructions which, when executed by one or more processors, cause the one or more processors to perform operations that include displaying game-play series of the wagering game tournament on at least a first display device and a second display device. Randomly selected outcomes are determined in the plurality of game-play series in which the plurality of players participate, the plurality of players including a first player and a second player. A tournament rank is assigned to each of the plurality of players in accordance with respective outcomes of the randomly selected outcomes achieved in the plurality of game-play series. In response to a tournament incentive, a tournament element is shared between the first player and the second player. The tournament element has an effect on the tournament rank. At least one tournament award is awarded based on the tournament rank.

Additional aspects of the invention will be apparent to those of ordinary skill in the art in view of the detailed description of various embodiments, which is made with reference to the drawings, a brief description of which is provided below.

Figure 1:
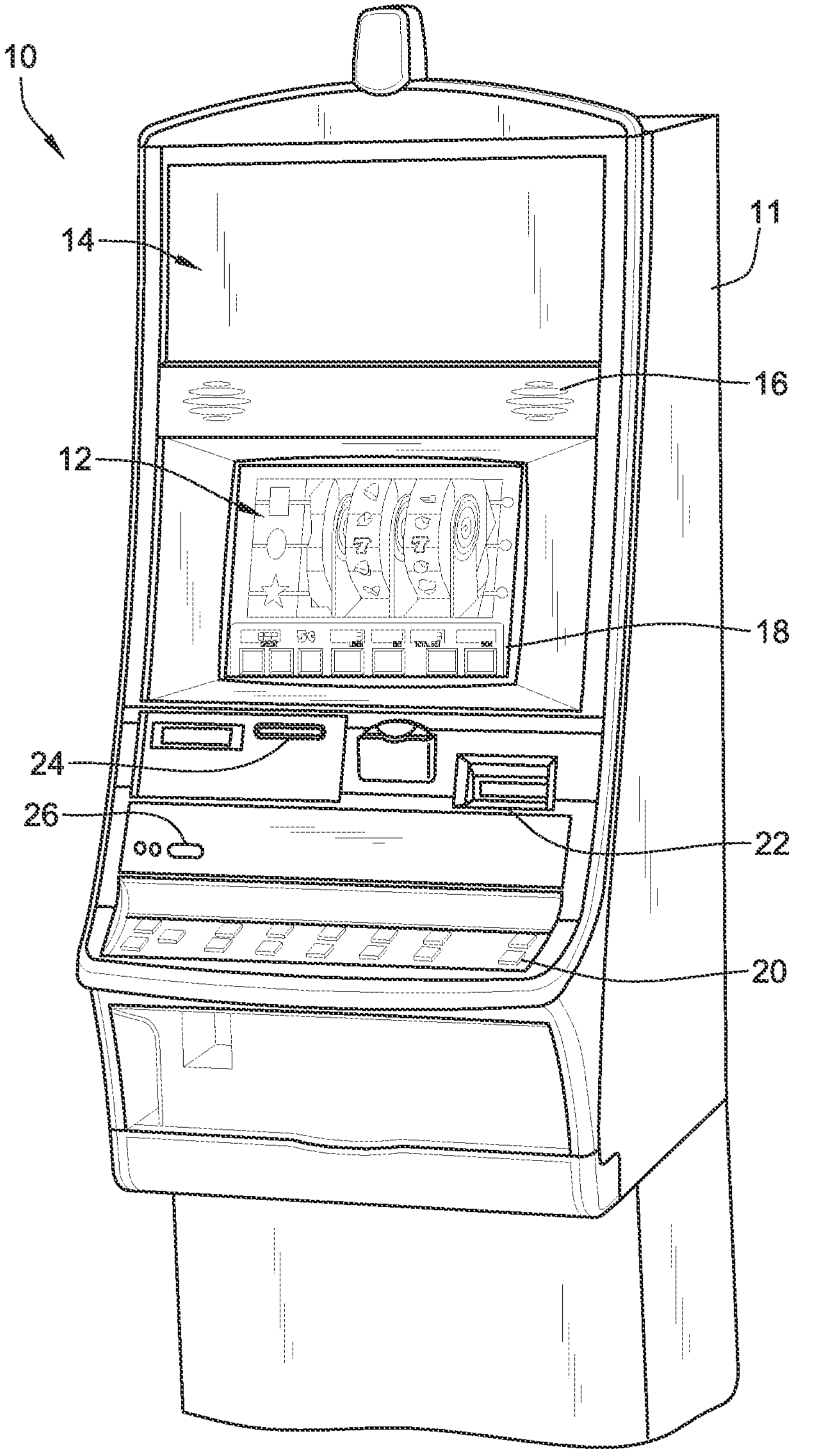
FIG. 1 (PRIOR ART)
FIG. 1 is a perspective view of a free-standing gaming terminal.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a main display area 12, a secondary display area 14, and one or more audio speakers 16. The main display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the main or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
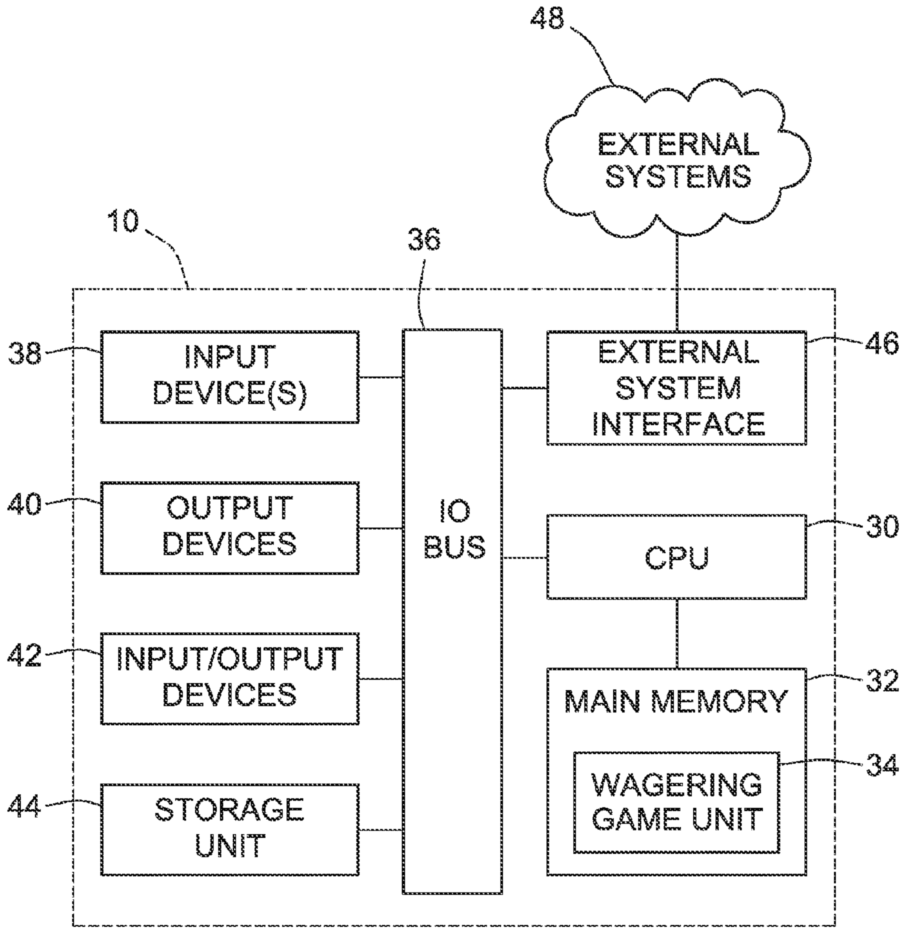
FIG. 2 (PRIOR ART)
FIG. 2 is a schematic view of a gaming system.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
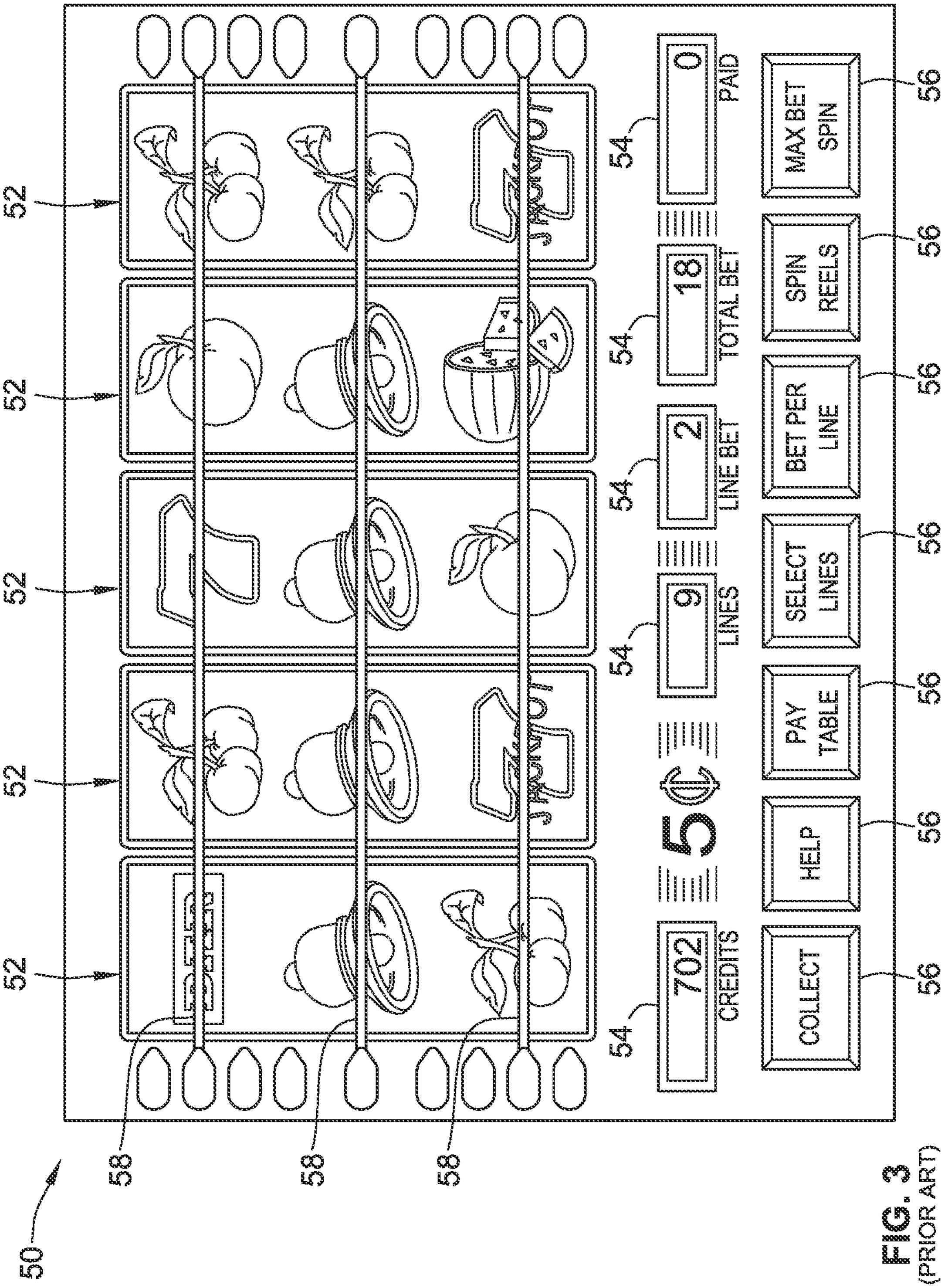
FIG. 3 (PRIOR ART)
FIG. 3 is an image of an exemplary basic-game screen of a wagering game displayed on a gaming terminal.

Referring now to FIG. 3, there is illustrated an image of a basic-game screen 50 adapted to be displayed on the main display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the main display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., main display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the main display 12, other display device, or other output device (e.g., speakers, lights, communication device, etc.) to change from a first state to at least a second state, wherein the second state of the main display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Tournament System

Generally, in reference to FIGS. 4-7 described below, a tournament system enables communications between individual game instances and a centrally administered tournament. The tournament system further identifies and administers groupings of multiple sizes of players, and enables one or more types of built-in sharing elements that are integrated into a tournament. The tournament system offers a tournament incentive for sharing events, such as strategic value, award, enhancement, etc.

The tournament system include a series of wagering contest events in which a plurality of players compete and/or collaborate with each other to win an overall award. The series of events, in aggregate, determine the overall award. For example, if the tournament includes 100 reel spins, the aggregate winning outcomes from the 100 reel spins will determine a tournament winner. By way of example, the tournament system includes slots tournaments (land-based), online tournaments, etc. The contest events in the series can be different bonus rounds, different sets of reel spins, different quests, etc.

The contest events are separate, distinct events from each other, but, in the aggregate, are all required to complete the tournament. Each contest event begins when a start-event condition is triggered and ends when an end-event condition is reached. For example, the start-event condition is triggered in response to a begin-tournament event in which the respective player is eligible and selected to participate. The end-event condition can occur, for example, when a wagering session is terminated (e.g., cashing-out) or when all game-play requirements associated with the respective contest event are fulfilled.

In some examples, the contest events in a tournament require linear or non-linear game-play progression from contest event A to contest event Z. For example, the tournament requires players to successfully cross a world map across ten different countries. Each country represents a specific event. The players may have to cross in a predetermined, linear order, e.g., country A, country B, Country C, etc., or in any desired order, e.g., country F, country B, country G, etc. Each contest event may have further contest sub-events, e.g., players have to successfully cross each state of each country.

In the tournament system, game-play series are displayed on different displays for different participating players. For example, a first game-play contest is displayed on a first display device for player A, on a second display device for player B, on a third display device for player C, etc. According to one example, the display devices are displays of respective gaming machines in a land-based gaming establishment, e.g., a casino. According to another example, the display devices are displays of respective computer screens in a social-media network conducted via an internet network.

Randomly selected outcomes are determined in each of the game-play series and a tournament rank is assigned to each participating player based on respective outcomes achieved by the players. For example, it is assumed that a first game-play contest requires each player to use 10 spins. After spinning the 10 spins, player A achieves a winning combination in which player A is awarded 100 tournament points, player B achieves a winning combination in which player B is awarded 50 tournament points, and player C achieves a winning combination in which player C is awarded 10 tournament points. Player A is ranked $1^{st}$, player B is ranked $2^{nd}$, and player C is ranked $3^{th}$.

In the above example, player A has the highest tournament rank and player C has the lowest tournament rank. The rank may change as additional game-play contest are conducted. Eventually, a tournament award is awarded to one or more of the higher-ranked player. If player A is still in the lead, player A is awarded the tournament award. Optionally, other awards, including consolation prizes, are awarded to lower-ranked players.

By way of further example, and still referring to the above example, a second game-play contest requires each player to successfully cross a map in ten minutes or less. Player A achieves this goal in nine minutes and receives 10 tournament points, player B achieves this goal in three minutes and receives 200 tournament points, and player C achieves this goal in 10 minutes and receives 5 tournament points. Player B is now ranked $1^{st}$, with a total of 250 tournament points, player A is now ranked $2^{nd}$, with a total of 110 points, and player C is still ranked $3^{th}$, with a total of 15 points. The players may receive contest-by-contest awards, likely smaller, for each specific contest, and tournament awards, likely larger, for the tournament.

The tournament system can be either a main event or a side event. For example, the tournament system is a main, standalone wagering event in which eligible players are selected for participation. In another example, the tournament system is a side event triggered during the main wagering event.

Participation in the tournament system can be either earned participation or buy-in participation. For example, players may have to achieve a certain outcome (e.g., achieve a certain symbol combination in a reel spin) to be eligible for participating in tournament play. In another example, players can buy their eligibility for participating in the tournament play. The buy-in can be, for example, inputting a wager of a predetermined amount for participating in the tournament play.

By way of example, a tournament system is described in commonly owned U.S. patent application Ser. No. 12/161,849 ("the '849 Application"), filed Jul. 23, 2008, published as U.S. Patent Application Publication No. 2009/0011827 A1, and titled "Wagering Game with Tournament-Play Features," which is incorporated herein in its entirety. For example, the '849 Application describes a tournament system in which a player places a wager on a tournament buddy (e.g., side wagering), a player makes one or more selections and then sit back and observe the results (e.g., passive participation), etc.

The shared elements may be limited or unlimited. If the shared elements are limited, players will be more likely to strategically share the elements in a manner that will optimize the likelihood of receiving a benefit in return.

Figure 4:
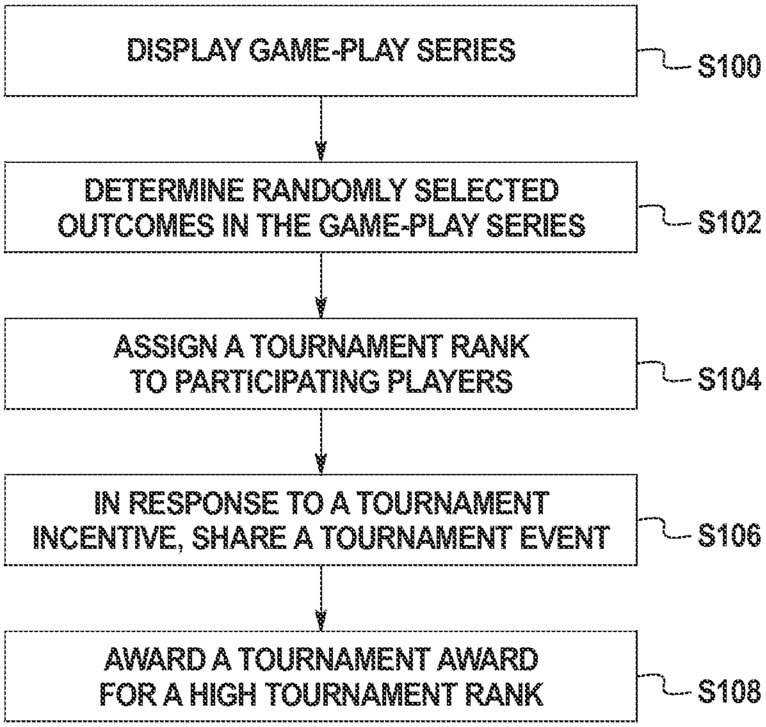
FIG. 4 is a diagrammatic illustrating tournament play in which elements are shared between participating players.

Referring specifically to FIG. 4, a tournament includes displaying a plurality of game-play series (S100). Randomly selected outcomes are determined in the game-play series (S102) and, based on the outcomes, a tournament rank is assigned to each of the participating players (S104). The players are ranked between a low rank and a high rank. In response to a tournament incentive, such as a strategic incentive or a specific tournament award, a tournament element is shared between one or more players (S106). According to one example, the tournament incentive is a strategic incentive in which a first player shares an element with a second player as a favor and based on the first player's assumption that the second player will repay the favor in the future (i.e., reciprocity). According to another example, the tournament incentive is a bonus award, e.g., 100 tournament points, that are awarded to one or more of the first player and the second player. Thus, the tournament incentive is applicable to either or both of the players between which the element is shared. A tournament award is awarded to a player with a high tournament rank (S108).

Shared Wilds

One type of sharing event is a wilds-sharing event in which wild symbols are shared and/or transferred between players' respective game instances. The sharing can be responsive to an option exercised by a particular player, a randomized group, or a player-defined group. The sharing can, then, enable reciprocity in which a recipient has the ability to share back an element.

The reciprocity of the sharing event includes a strategy aspect in which players may share wilds with players that are likely to re-pay the favor in the future. For example, if player A knows that player B is more likely than player C to reciprocate the favor in future gameplay, player A will likely share a wild symbol with player B than player C. Assuming that player A is correct, player A will reap the benefit of this kind gesture towards player B, i.e., sharing the wild symbol, in future gameplay. Thus, the sharing encourages collaboration between players and promotes tournament play.

In addition to or alternative to reciprocity, the strategy aspect is directed to wisely sharing a limited number of available elements with other players. If player A in the above example only has a single element that can be shared, player A will likely exercise great care and thought with which player between player B and player C the single element should be shared.

Shared Bonus Rounds

Another type of sharing event is a bonus round-sharing event in which bonus rounds are shared and/or transferred between players' respective game instances. Similar to the wilds-sharing event, the sharing can be responsive to options exercised by a player or a group of players, with reciprocity being enabled as an option for one or more of the recipient players. Other examples of shared elements include higher-paying symbols, reel strips, symbol clumps, bonus triggers, multipliers, modified arrays, or any type of enhancement.

Shared Incentives

Yet another example of a sharing event is an incentive-sharing event in which new players are invited for singular-player benefit or for mutual-player benefit. For example, if a new player accepts an invitation within a predetermined time frame and joins a tournament, both the sharing player and the new recipient player receive a bonus in the tournament. By way of a further exemplary feature, a separate contest is included within the tournament and provides an award to a participating player that shares the most invitations and/or receives the most responses. This aspect is further described below in reference to a pyramid-type feature of the tournament system.

Other incentives for recruiting players include access to a specific game or a higher winning return. For example, if a participating player recruits one or more new players, the participating player receives access to a specific slot machine that would otherwise not be accessible by the participating player. In addition or alternatively, the access to the specific game is provided to the recruited player(s).

In another example, the participating player receives for a limited time an increased winning return if a specific recruiting goal is met. For example, if the participating player has successfully recruited X number of new players, the participating player receives pays at 5% higher than standard for one day. In addition or alternatively, the limited higher pay is provided to the recruited player(s).

According to one aspect of the incentive-sharing event, tournaments risks and awards are related to the number of players invited and/or recruited to participate in the tournament play. For example, the greater the number of players invited, the greater the awards for the recruiting player, but also the greater the risks for the recruiting player. By way of a specific example, recruiting player A receives 10 wild symbols for recruiting 10 new players. The risk for player A in this scenario is that player A may be undermined by the 10 new players against which player A will be competing at some point during the tournament. If the recruiting player A recruits 100 players, in this scenario, player A receives 100 wild symbols as an award, but player A now has 100 new players to face in competition. Thus, the awards may increase proportional to the number of new recruited players but so will the risk for the recruiting player.

Pyramid

Figure 5:
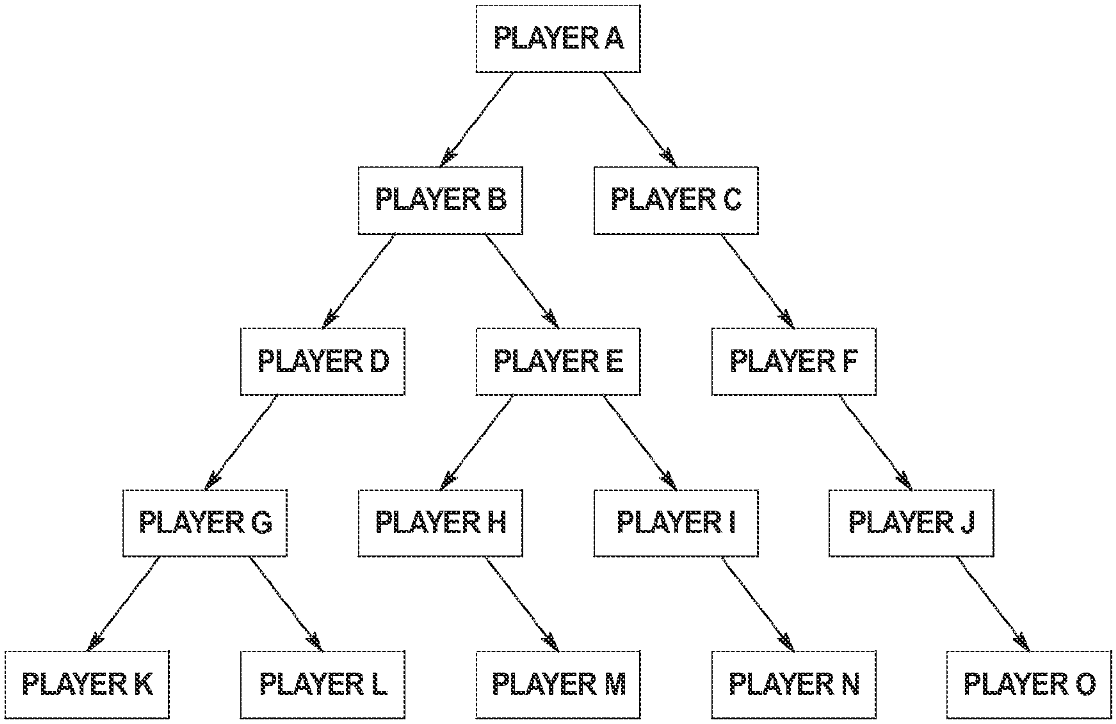
FIG. 5 is a diagrammatic illustrating a pyramid aspect of tournament play in which players are recruited to join a tournament.

Referring to FIG. 5, sharing in tournament play is optionally directed to recruiting new players in a pyramid-type manner. To encourage tournament virality, in which participant players are encouraged to recruit as many new players as possible, participant players that recruit new players obtain awards for their efforts. For example, awards can be bonus points for each of the newly recruited player, awarded multipliers, fractional portions of multipliers, etc.

To recruit the new players, the participant players share elements that provide an incentive for the new players to join the tournament. For example, participant player A shares a number of wild symbols with non-participant player B. In response, non-participant player B joins the tournament and, in return, participant player A receives an award. The award for participant player A can be a credit award, an element for use during the tournament, an element for use during non-tournament play, etc.

Furthermore, the award for the participant player A can be a pyramid-type award that is dependent on the number of new players that are recruited by participant player A. The more new players that are recruited, the larger the award. For example, participant player A may receive a Y award if one new player is recruited, Y+1 award if two new players are recruited, Y+2 award if three new players are recruited, etc.

Additionally, the new players can include players that are directly recruited or that are indirectly recruited. Indirect recruiting occurs when a new player is recruited by a player that has been recruited by participant player A. In other words, player C is an indirect recruit of player A if player A recruits player B and player B recruits player C.

The award may increase linearly or according to any function. For example, the increase in the award may be larger for directly recruited players than for indirectly recruited players. In a specific example, the increase in the award may be a multiplier 2Y if the recruited player is a direct recruit and Y+1 if the recruited player is an indirect recruit.

In the illustrated example, one player (Player A) has directly/indirectly caused fourteen additional players to join the tournament (Player B—Player O). Although Player A has sent direct invitations to only two players (Player B and Player C), those two players caused the invitation and joining of other players.

Challenges

One aspect of tournament play is directed to overcoming tournament challenges. In other words, players may wish to help each other to achieve certain goals by meeting predetermined play criteria. For example, a tournament challenge may require players to accumulate X number of wilds. If player A has X+1 wilds and player B has X−1 wilds, player A may share a wild with player B so that both players are able to meet the challenge. As discussed above, one reason for player A to share the wild with player B is based on reciprocity, i.e., do a good deed for a friend now and, in return, the friend will pay you back in the future.

By way of another example, a tournament challenge may be for players to accumulate 10,000 credits in 10 minutes. To improve the likelihood that the player can beat the challenge, players share elements. For example, player A does not wish to accept the challenge for various reasons, including that the challenge is not likely to be met and is not worthwhile his or her efforts. However, player B (friend of player A) decides to accept the challenge. To improve the likelihood that player B will beat the challenge, player A shares three wilds with player B.

By way of yet another example, the tournament challenge may require a group effort. For example, the tournament challenge of acquiring 10,000 credits in 10 minutes may require 18 players that collaborate to beat the challenge. As such, the 18 players share elements 0 that will improve the group's likelihood of beating the challenge. For example, instead of having each of the 18 players use a single wild in each of their respective spins, the 18 players might focus their efforts and share the wilds with one single player of the group to give him or her access to using all the wilds. In turn, this may improve the group's likelihood of beating the challenge. Optionally, in addition to acquiring 10,000 credits in 10 minutes, another condition of the challenge is to have each player of the group share at least two elements.

Trials of Alliance—Defiance

Figure 6:
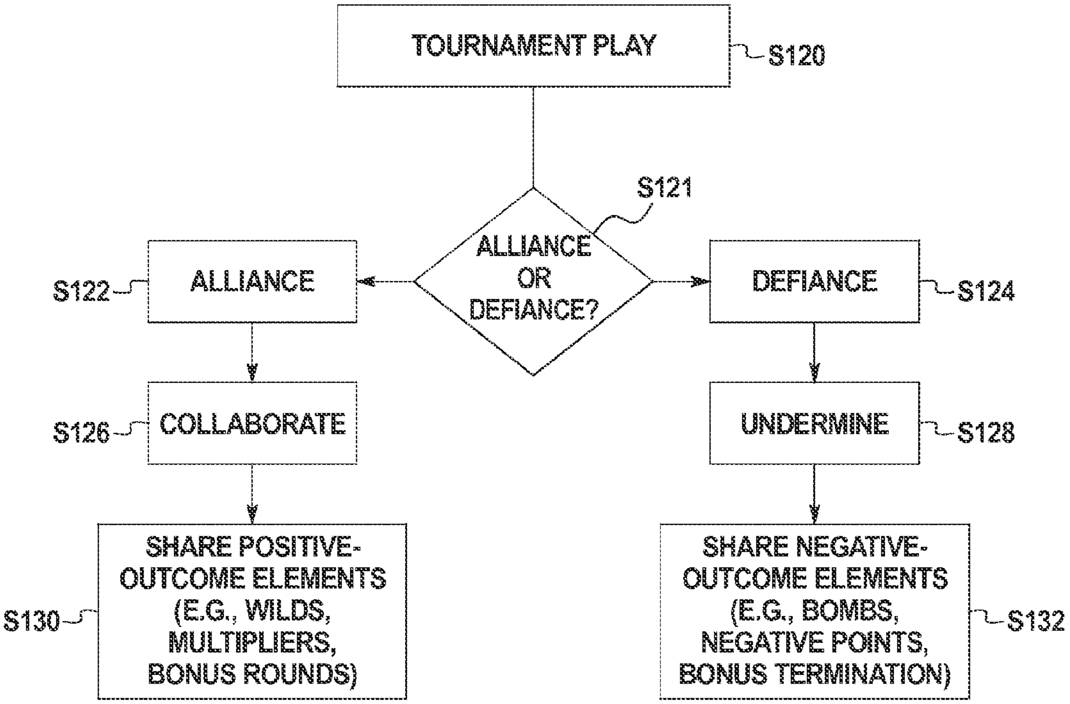
FIG. 6 is a diagrammatic illustrating alliance and defiance aspects of a tournament.

Referring to FIG. 6, In another aspect of tournament play (S120), players conduct trial events that are directed either to paths of alliance or paths of defiance. Depending on which paths are taken or required (S121), the paths of alliance (S122) and/or defiance (S124) require the players to either collaborate with each other (S126) or require the players to undermine each other (S128). For at least some part of the tournament, players may conduct events along paths of alliance that require players to form alliances and collaborate with each other to meet tournament goals, defeat tournament challenges, achieved specific tournament outcomes, etc. (S130).

Additionally, or alternatively, for at least some part of the tournament, players may conduct events along paths of defiance that require players to undermine each other's efforts. For example, player A may share a negative-outcome element (e.g., throw a "bomb") with player B to prevent player B from meeting tournament goals, defeating tournament challenges, achieving favorable tournament outcomes, etc. (S132).

In another specific example, referring to the group challenge of 10,000 credits identified above, different groups undermine each other's efforts in meeting the challenge. For example, the tournament includes several groups of 10 players. Group A may share negative elements with Group B to slow down or decrease the credits of Group B in an effort to meet the challenge first.

According to a strategic aspect of tournament play, different groups may undermine (or attack) other groups based on the effect that the attacked group may have on the attacking group. For example, with two minutes left in the challenge, group A is leading other groups with 9,000 points, group B is second with 7,000 points, and group C is third with 6,000 points. Groups B and C will likely focus their attack on group A to prevent that group from meeting the challenge. In turn, group A will likely focus their attack solely on group B, which is the closest current threat in group A's quest to meet the challenge.

Sub-Tournaments and Mid-Tournament Pay Enhancements

Additionally or alternatively to the sharing aspect, the tournament system includes one or more other aspects. For example, the tournament system spawns one or more sub-tournaments or new tournaments based on outcomes in the (primary) tournament system. In another example, a purchase feature is enabled in which players can purchase mid-tournament play enhancements and/or status. In yet another example, one or more features discussed above and enabled during the tournament system are available for play during regular non-tournament wagering gameplay.

According to another aspect of the tournament system, sharing of events earns players the right to initiate and/or customize a tournament. For example, based on the sharing of a specific type of element, or based on the sharing of a specific number of events, the player that initiates the sharing is awarded a tournament-initiation element. The player can initiate the tournament any time, at a predetermined time, within a specified date, etc. Furthermore, the player is optionally provided with options in reference to tournament format, including how many and which players may participate, tournament play, tournament awards, etc. The options allow the player to customize the tournament as desired within random and/or predetermined parameters.

Slot Shots Enhancements

According to one type of tournament system, participating players accumulate enhancements in a challenge-type tournament play. The enhancements are available for play during the tournament play or during regular non-tournament wagering gameplay. Furthermore, the enhancements are accumulated only during the tournament play and they can either help a player's game or impede a player's game.

The tournament play in this type of tournament system includes a challenging player that challenges one or more other players to a winner-takes-all contest. By accepting the challenge, the accepting players automatically receive the same enhancements as the challenging player to use in the tournament. Alternatively, the accepting players receive random enhancements for use in the tournament.

The challenge results in a competition between the challenging (or initiating) player and all the invitee (or accepting) players who accept the challenge in a given time frame. The potential winnings in the competition are determined by the aggregate credits won by all participating players. Accordingly, a benefit for the initiating player is that the more players are invited, the greater the reward in the competition. At the same time, however, the initiating player increases his or her risk of losing the competition as more players accept invitations to the challenge.

Other aspects and details of this type of challenge tournament play are described in commonly owned U.S. patent application Ser. No. 13/760,532 ("the '532 Application"), filed Feb. 6, 2013, and titled "Systems, Methods and Devices for Playing Wagering Games with Distributed Competition Feature," which is incorporated herein in its entirety. For example, the '532 Application describes a SLOT SHOT feature in which competitive multi-player game play is offered to achieve more advantageous game outcomes.

League Play

According to one type of tournament system, participating players are eligible for joining a league in which the tournament play includes a sports-like competition with seasons, including regular seasons and playoffs. As such, the league can include one or more tournaments. A season, for example, includes a Z series of contests in which N number of players compete. Based on the outcomes in the Z series of contests, then, the players compete in playoff competition (s). The players competing in the playoffs can be less than the N number of players or the same number of players.

According to one example, each of the N number of players is ranked during the regular season in accordance with achieved outcomes (e.g., accumulated points) relative to others of the N number of players. Then, during the playoff season, top ranked players (e.g., top 8 players) compete against each other.

Awards are presented to the players in accordance with the achieved outcomes, including the achieved ranking. For example, as players achieve higher and higher rankings they are presented with higher and higher awards, including receiving large awards during the playoff seasons and small awards during the regular seasons.

In league-type play, participating players optionally manage other players. For example, a tournament may provide an award if one or more players move across a map from point A to point B within a 24-hour period. The more players participating in the tournament, the faster the travel time across the map. Players can recruit other players and manage recruited players' movements, which can be associated in groups and/or sub-groups, to coordinate efforts and reach the goal within the specified time limit. The award is shared between the participant players based on individual efforts.

Element Building

According to another aspect of the tournament system, players modify an element that is sharable between players. For example, players contribute to building an element that is shared from one player to another player. The built element includes, for example, a reel, aspects of role-playing games, wild symbols, multipliers, a weapon, a character, etc. Players can grow, or increase, a multiplier from a 1× multiplier to a 10× multiplier. According to another specific example, players collaborate to build a reel having specific symbols, e.g., ten wild symbols, five 3× multipliers, etc. Optionally, the players can lose the built element in response to certain outcomes.

Race for Claimable Enhancements

Figure 7:
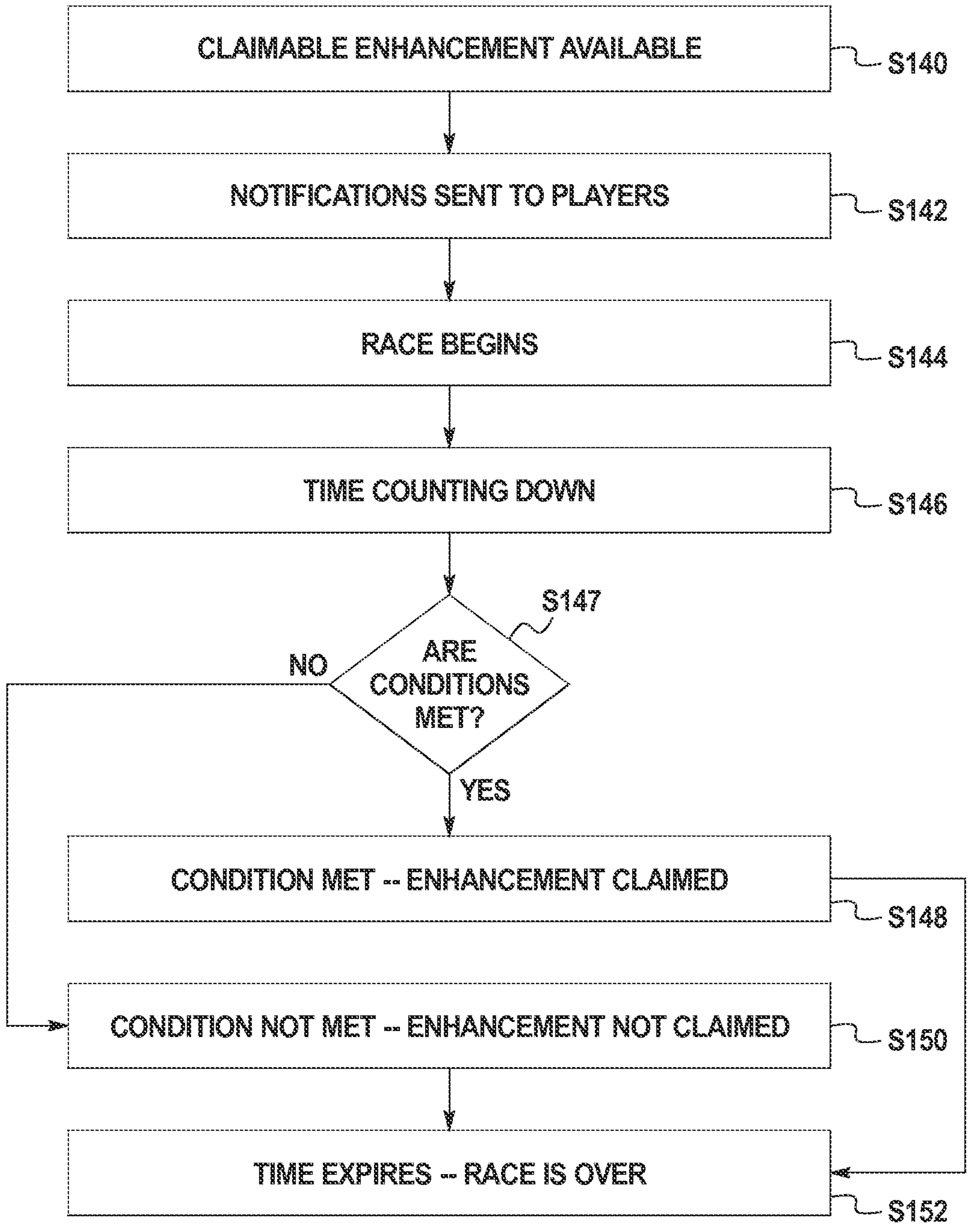
FIG. 7 is a diagrammatic illustrating a race aspect of a tournament

Referring to FIG. 7, according to another aspect of the tournament system, players race to receive a claimable enhancement. For example, players have a time limit to achieve an outcome in which a 10× multiplier is awarded. Based on required conditions, a frenzy of sharing activity is encouraged in which players share events to obtain the 10× multiplier. When the claimable enhancement is available (S140), notifications are sent to players (S142). For example, notifications are sent that the 10× multiplier is available. Then, the race begins (S144) and time being a count-down (S146). The required conditions may include, for example, sending invitations to an X number of non-participating players, sharing a Y number of events with other participating players, successfully recruiting an M number of new players, etc.

A determination is made whether the conditions are met (S147). If the race conditions are met (S148), the enhancement is claimed by the respective player(s). If the race conditions are not met (S150), the enhancement cannot be claimed. When the time expires, the race is over (S152).

As such, the race is directed to an element that is claimable by a player that meets the required conditions. Furthermore, the race is directed to an enhancement that can enhance a game outcome for the player and, thus, help increase status and/or ranking of the player in the tournament. For example, after being acquired, the claimable enhancement is applied to a next base or bonus game played by the acquiring player in the tournament. The claimable enhancement is applied automatically or in response to a player selection.

Optionally, the claimable enhancements can be auctioned to other tournament players. Thus, a claimed enhancement is shared with another player that has offered the highest bid. By way of example, players can bid credits, other claimed enhancements, and/or other sharable events.

By way of a specific example, during a tournament every two minutes an element (or item) is placed on a side-bar and is made available for bidding, e.g., 20× multiplier. If one player of a group successfully bids on the 10× multiplier, the entire group receives the item. In bidding, players are likely to weigh their options whether to use their tournament points on the item being auctioned or, alternatively, save the tournament points for achieving a high ranking in the tournament.

Buy Tournament Events

According to another aspect of the tournament system, players purchase events of a tournament. For example, participant players make side bets on at least a partial outcome of another player and, if successful, the betting player receives certain events associated with the outcome.

By way of a specific example, player A makes a side bet that player B will receive in a reel spin at least three wild symbols. If player B receives the three wild symbols in the reel spin, player A also receives the three wild symbols. After player B receives the three wild symbols, for example, with wild symbol A in a top-left position, wild symbol B in a top-middle position, and wild symbol C in a bottom-right position, and player A spins the reels, the same positions are tracked to provide for player A the wild symbol A in the top-left position, the wild symbol B in the top-middle position, and the wild symbol C in the bottom-right position. Thus, the symbols achieved in the reel spins of player B and for which player A has successfully made the side bet are replicated in the reel spins of player A. In other words, player A makes a side bet to receive for future use the same specific enhancement symbols that player B receives.

Optionally, the enhancement symbols are received by and applied to player A in the same order and position as those enhancement symbols are received by and applied to player B. Thus, according to this aspect of the tournament system, player A wagers on a specific portion of player B's outcome that player A deems to be beneficial for and applied to player A's own outcomes. An optional notification is sent to player B that player A has placed a side bet on player B's partial outcome and/or player A has been successful.

In another example, player A is a non-participant tournament player and the award is eligibility to participate in tournament play. In other words, player A is a player that is currently not eligible for participating in the tournament, but wishes to participate. Player A is provided with an option to win his or her eligibility by side betting on other players (which may be participating or non-participating tournament players). The award for the side bet is tournament eligibility.

Each of these embodiments and obvious variations thereof is contemplated as falling within the spirit and scope of the claimed invention, which is set forth in the following claims.

What is claimed is:

1. A tournament gaming system for offering a wagering game tournament to a plurality of players, the tournament gaming system comprising:

one or more input devices;

a plurality of display devices including at least a first display device and a second display device;

one or more processors; and one or more memory devices storing instructions that, when executed by at least one of the one or more processors, cause the tournament gaming system to:

display, on at least the first display device and the second display device, a plurality of game-play series of the wagering game, determine randomly selected outcomes in the plurality of game-play series in which the plurality of players participate, the plurality of players including a first player and a second player, assign a tournament rank to each of the plurality of players in accordance with respective outcomes of the randomly selected outcomes achieved in the plurality of game-play series, send an invitation from the first player to the second player to participate in the wagering game tournament, in response to the second player accepting the invitation from the first player to participate in the wagering game tournament, share a tournament game-play element between the first player and the second player, the tournament game-play element having an effect on the tournament rank, and award a tournament award based on the tournament rank.

2. The tournament gaming system of claim 1, wherein the tournament game-play element is selected from a group consisting of game enhancements and negative-outcome elements.

3. The tournament gaming system of claim 2, wherein the game enhancements are selected from a group consisting of wild symbols, scatter symbols, multipliers, bonus triggers, bonus rounds, higher-paying symbols, and reel strips.

4. The tournament gaming system of claim 1, wherein the stored instructions further cause the tournament gaming system to conduct trial events in which the first player and the second player collaborate with each other in at least one of the plurality of game-play series.

5. The tournament gaming system of claim 1, wherein the stored instructions further cause the tournament gaming system to conduct trial events in which at least one of the first player and the second player undermines the other of the first player and the second player in at least one of the plurality of game-play series.

6. The tournament gaming system of claim 1, wherein the stored instructions further cause the tournament gaming system to conduct trial events in which the first player and the second player (a) collaborate with each other in at least a first one of the plurality of game-play series and (b) undermine each other in at least a second one of the plurality of game-play series.

7. The tournament gaming system of claim 1, wherein the stored instructions further cause the tournament gaming system to provide, in response to receiving a payment, a game enhancement to a player of the plurality of players, the payment affecting player rank in the wagering game tournament.

8. The tournament gaming system of claim 1, wherein the stored instructions further cause the tournament gaming system to award a claimable enhancement to at least one player of the plurality of players that successfully achieves one or more tournament conditions within a predetermined time limit, the claimable enhancement modifying a game-play outcome.

9. The tournament gaming system of claim 1, wherein the stored instructions further cause the tournament gaming system to present, in response to the second player accepting the invitation from the first player to participate in the wagering game tournament, an incentive award to the first player.

10. The tournament gaming system of claim 9, wherein the stored instructions further cause the tournament gaming system to present a recruitment award to the second player for accepting the invitation from the first player to participate in the wagering game tournament.

11. A computer-implemented method for offering a wagering game tournament to a plurality of players, the computer-implemented method comprising:

displaying on at least a first display device and a second display device a plurality of game-play series of the wagering game tournament;

determining, by at least one of one or more processors, randomly selected outcomes in the plurality of game-play series in which the plurality of players participate, the plurality of players including a first player and a second player;

assigning a tournament rank, by at least one of the one or more processors, to each of the plurality of players in accordance with respective outcomes of the randomly selected outcomes achieved in the plurality of game-play series;

sending an invitation from the first player to the second player to participate in the wagering game tournament;

in response to the second player accepting the invitation from the first player to participate in the wagering game tournament, sharing, by at least one of the one or more processors, a tournament game-play element between the first player and the second player, the tournament game-play element having an effect on the tournament rank; and awarding, by at least one of the one or more processors, at least one tournament award based on the tournament rank.

12. The computer-implemented method of claim 11, wherein the tournament game-play element is a game enhancement selected from a group consisting of wild symbols, scatter symbols, multipliers, bonus triggers, bonus rounds, higher-paying symbols, and reel strips.

13. The computer-implemented method of claim 11, further comprising conducting, by at least one of the one or more processors, trial events in which the first player and the second player (a) collaborate with each other in at least a first one of the plurality of game-play series and (b) undermine each other in at least a second one of the plurality of game-play series.

14. The computer-implemented method of claim 11, further comprising, in response to receiving a payment, providing, by at least one of the one or more processors, a game enhancement to a player of the plurality of players, the payment affecting player rank in the wagering game tournament.

15. The computer-implemented method of claim 11, further comprising awarding, by at least one of the one or more processors, a claimable enhancement to at least one player of the plurality of players that successfully achieves one or more tournament conditions within a predetermined time limit, the claimable enhancement modifying a game-play outcome.

16. The computer-implemented method of claim 11, further comprising, in response to the second player accepting the invitation from the first player to participate in the wagering game tournament, awarding, by at least one of the one or more processors, at least one of (a) an incentive award to the first player and (b) a recruitment award to the second player.

17. One or more machine-readable non-transitory storage media including instructions which, when executed by one or more processors, cause the one or more processors to perform operations comprising:

displaying on at least a first display device and a second display device a plurality of game-play series of the wagering game tournament;

determining randomly selected outcomes in the plurality of game-play series in which the plurality of players participate, the plurality of players including a first player and a second player;

assigning a tournament rank to each of the plurality of players in accordance with respective outcomes of the randomly selected outcomes achieved in the plurality of game-play series;

sending an invitation from the first player to the second player to participate in the wagering game tournament;

in response to the second player accepting the invitation from the first player to participate in the wagering game tournament, sharing a tournament game-play element between the first player and the second player, the tournament game-play element having an effect on the tournament rank; and awarding at least one tournament award based on the tournament rank.

18. The machine-readable non-transitory storage media of claim 17, further comprising conducting trial events in which the first player and the second player (a) collaborate with each other in at least a first one of the plurality of game-play series and (b) undermine each other in at least a second one of the plurality of game-play series.

19. The machine-readable non-transitory storage media of claim 17, further comprising providing, in response to receiving a payment, a game enhancement to a player of the plurality of players, the payment affecting player rank in the wagering game tournament.

* * * * *